US008987596B2

(12) United States Patent
Mirebeau et al.

(10) Patent No.: US 8,987,596 B2
(45) Date of Patent: Mar. 24, 2015

(54) HIGH VOLTAGE ELECTRIC CABLE

(75) Inventors: Pierre Mirebeau, Villebon S/Yvette (FR); Jérôme Matallana, Sainte Marie Kerque (FR); Jean-Francois Brame, Paris (FR); Hakim Janah, Coulogne (FR)

(73) Assignee: Nexans, Paris (FR)

( * ) Notice: Subject to any disclaimer, the term of this patent is extended or adjusted under 35 U.S.C. 154(b) by 698 days.

(21) Appl. No.: 12/472,640

(22) Filed: May 27, 2009

(65) Prior Publication Data

US 2009/0321108 A1 Dec. 31, 2009

(30) Foreign Application Priority Data

Jun. 11, 2008 (FR) ...................................... 08 53878

(51) Int. Cl.
| | | |
|---|---|---|
| *H01B 7/00* | (2006.01) | |
| *H01B 3/44* | (2006.01) | |
| *C08L 23/06* | (2006.01) | |
| *C08L 53/02* | (2006.01) | |
| *H01B 9/02* | (2006.01) | |

(52) U.S. Cl.
CPC ................ *H01B 3/441* (2013.01); *C08L 23/06* (2013.01); *H01B 3/442* (2013.01); *C08L 53/02* (2013.01); *C08L 2203/202* (2013.01); *C08L 2205/02* (2013.01); *C08L 2205/025* (2013.01); *H01B 9/027* (2013.01)

USPC .............................. 174/110 PM; 174/120 SC

(58) Field of Classification Search
USPC .......................... 174/110 R, 100 PM, 120 SC
See application file for complete search history.

(56) References Cited

U.S. PATENT DOCUMENTS

| | | | |
|---|---|---|---|
| 4,060,659 A | | 11/1977 | Matsubara et al. |
| 6,225,363 B1 * | | 5/2001 | Wilkes et al. .................... 521/81 |
| 6,369,129 B1 | | 4/2002 | Mårtensson et al. |
| 2001/0030053 A1 | | 10/2001 | Gadessaud et al. |
| 2005/0119407 A1 * | | 6/2005 | Aarila et al. ...................... 525/53 |
| 2009/0176093 A1 * | | 7/2009 | Appel et al. .................. 428/377 |

FOREIGN PATENT DOCUMENTS

JP      2001-256832     *   9/2001

OTHER PUBLICATIONS

International Search Report dated Jan. 7, 2009.

* cited by examiner

*Primary Examiner* — Chau N Nguyen
(74) *Attorney, Agent, or Firm* — Sofer & Haroun, LLP

(57) ABSTRACT

The present invention relates to an electric cable comprising a conductor element, an electrically insulating layer surrounding said conductor element, said electrically insulating layer being obtained from a mixture comprising polyethylene and a styrene copolymer, wherein the polyethylene is a plurimodal polyethylene.

11 Claims, 1 Drawing Sheet

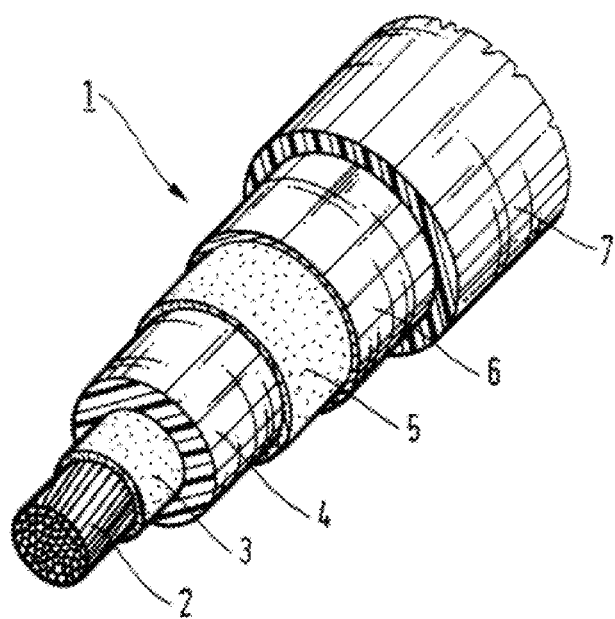

HIGH VOLTAGE ELECTRIC CABLE

RELATED APPLICATION

This application claims the benefit of priority from French Patent Application No. 08 53878, filed on Jun. 11, 2008, the entirety of which is incorporated by reference.

FIELD OF THE INVENTION

The present invention relates to an electric cable having a layer of electrical insulation based on polyethylene and a styrene copolymer.

It applies typically, but non-exclusively to the fields of power cables for high or very high voltage direct current (HVDC).

These power cables are typically cables for 60 kilovolts (kV) to 600 kV.

BACKGROUND OF THE INVENTION

Document FR 2 805 656 describes a high or very high voltage DC electric cable.

The high or very high voltage DC (HVDC) electric power cable comprises a central conductor element, and in succession and coaxially about the central conductor: an inner semiconductive shield; an extruded electrically insulating layer; an outer semiconductive shield; a protective metal shield; and an outer protective sheath.

The electrically insulating extruded layer is made from a mixture comprising polyethylene and a styrene copolymer, the content of styrene in said mixture lying in the range 11% to 18% by weight.

Nevertheless, when extruding said mixture around the conductor example, the electrically insulating layer formed in that way presents thickness that is not uniform, and therefore a surface appearance that is perceptibly not cylindrical.

Consequently, the dielectric properties of the electrically insulating layer are affected and are not identical over the entire thickness of said layer.

The invention seeks to solve the problems of the prior art by proposing an electric cable including an electrically insulating layer based on polyethylene and a styrene copolymer, and having dielectric properties that are uniform and good throughout its thickness.

OBJECT AND SUMMARY OF THE INVENTION

To this end, the invention provides an electric cable comprising a conductor element, an electrically insulating layer surrounding said conductor element, said electrically insulating layer being obtained from a mixture comprising polyethylene and a styrene copolymer, wherein the polyethylene is a plurimodal polyethylene.

By means of the invention, the dielectric properties of the electrically insulating layers are optimized in surprising manner. The quantity of electric charge present in said layer (or space charge), in particular the quantity of so-called "trapped" electric charge in said layer, is minimized in significant manner in the presence of high or very high voltage DC, thereby considerably lowering the risks of the electric cable breaking down.

The term "plurimodal" polyethylene is used to mean a mixture of at least two polyethylene fractions produced under different conditions of polymerization and thus resulting in a different molecular weight for each fraction.

When the plurimodal polyethylene has only two polyethylene fractions of different molecular weights, the polyethylene is said to be "bimodal".

The chemical natures of said fractions having different molecular weights may be identical, i.e. the polyethylene fractions may, for example, be constituted solely by fractions of ethylene copolymers or solely of fractions of ethylene homocopolymers.

It is also possible for the chemical natures of the factions to be different. Thus, one or more fractions may be constituted by an ethylene copolymer, while one or more other fractions may be constituted by an ethylene homocopolymer.

Preferably, the electrically insulating layer is not cross-linked, thus making it possible to avoid the presence of cross-linking by-products that lead to an increase in space charge density.

In a particularly preferred embodiment, the content of styrene in said mixture is not greater than 10% by weight, and preferably not greater than 9% by weight, and preferably not greater than 8% by weight.

Advantageously, the upper limit serves to obtain dielectric properties that are remarkable and uniform throughout the thickness of the insulating layer while retaining good mechanical properties.

This maximum limit also serves to guarantee an optimum constant thickness for the electrically insulating layer around the conductor element, in particular for thicknesses greater than 10 millimeters (mm).

In another embodiment, the content of styrene in the mixture is at least 4% by weight in order to ensure electric charge flows in satisfactory manner in the electrically insulating layer.

The polyethylene used in the mixture of the present invention is preferably a bimodal polyethylene.

In addition, the polyethylene may be a medium or high density polyethylene, thereby enabling the electric cable of the present invention, in particular the high or very high voltage direct current power cable, to be capable of operating well at temperatures as high as 80° C.

The styrene copolymer in the mixture of the present invention is preferably selected from copolymers of styrene and butadiene and of styrene and isoprene, and more particularly it may be a hydrogenated three-sequence copolymer.

In a particular embodiment, the insulating layer of the electric cable of the present invention has a thickness of at least 10 mm.

Other characteristics and advantages of the present invention appear in the light of the following description of a non-limiting example of an electric cable of the invention made with reference to FIG. 1, which is a diagrammatic perspective view of an electric cable in a preferred embodiment in accordance with the invention.

For reasons of clarity, only those elements that are essential for understanding the invention are shown diagrammatically, and they are not shown to scale.

The high or very high voltage DC power cable 1 shown in FIG. 1 comprises a central conductor element 2 and, in succession and axially around said elements: an inner semiconductive shield 3; an electrically insulating layer 4; an outer semiconductive shield 5; a protective metal shield 6; and an outer protective sheath 7.

The presence of the shields 3, 5, and 6 and of the outer protective sheath 7 is preferred. The electrically insulating layer 4 is made in accordance with the present invention.

This electrically insulating layer 4 is typically extruded around the conductor element 2.

The protective structure, which comprises the metal shield 6 and the outer protective sheath 7, may also include other protective elements, such as, in particular, a protective strip (not shown) that swells in the presence of water and that is semiconductive, preferably being interposed between the outer semiconductive shield and the protective metal shield, metal reinforcement made of steel wires preferably positioned around the outer protective sheath 7, or polypropylene strings preferably positioned around the outer protective sheath 7.

The protective structure of the cable as such is of known type and lies outside the scope of the present invention.

BRIEF DESCRIPTION OF THE DRAWING

In the example shown in FIG. 1, the electrically insulated layer 4 of the electric cable 1 is not cross-linked and is obtained from a mixture of plurimodal polyethylene and a hydrogenerated three-sequence styrene copolymer, the content of the styrene in said mixture being no greater than 10% by weight.

MORE DETAILED DESCRIPTION

In addition, the mixture may include an anti-oxidant to limit degradation of said mixture while it is being worked in an extruder, for example.

In order to show the advantages obtained with mixtures of the present invention, the Applicant has made various same-thickness samples from the mixtures specified in Table 1 below, these samples not being cross-linked.

TABLE 1

| Mixture M | M-A | M-B | M-C | M-1 |
|---|---|---|---|---|
| Monomodal HDPE | 100 | 50 | / | / |
| Plurimodal HDPE | / | / | 100 | 75 |
| Styrene copolymer | / | 50 | / | 25 |
| Percentage by weight of styrene in mixture M | 0 | 15 | 0 | 7.5 |

Mixtures M-A, M-B, and M-C correspond to so-called "comparative" mixtures, while mixture M-1 corresponds to a mixture in accordance with the present invention.

The monomodal polyethylene in comparative mixtures M-A and M-B is a polyethylene in which the molecular weight distribution of the polyethylene is monomodal, i.e. said polyethylene has only one type of polyethylene fraction.

The origins of the various ingredients in Table 1 are as follows:

monomodal HDPE is a monomodal high density polyethylene sold by the supplier Dow Chemical under the reference 35057E;

plurimodal HDPE is a bimodal high density polyethylene sold by the supplier Dow Chemical under the reference XZ 89204;

styrene copolymer is a styrene-butadiene-styrene copolymer (SEBS) having 30% by weight of styrene, as sold by the supplier Kraton Polymer under the reference G 1652.

The respective ingredients for M-A, M-B, M-C, and M-1 were loaded into an extruder and then extruded in strips to obtain respective plane samples M-A, M-B, M-C, and M-1.

The characterization of the dielectric properties of the extruded layers of samples M-A, M-B, M-C, and M-1 was performed using disks having a diameter of 40 mm and a thickness of 0.7 mm, by implementing several methods suitable for assessing the dielectric behavior of a material subjected to electrical or thermal stress.

1. Trapped Charge Density

The method used for determining the trapped charge density in the electrically insulating layer is the so-called "mirror" method that is well known to the person skilled in the art.

This method consists in injecting point electric charges of about 11.6 picocoulombs (pC) with the help of a scanning electron microscope into the extruded layers of the samples M-A, M-B, M-C, and M-1. This method is described in detail in the document "Materials for HDVC extruded cables" by H. Janah, J. Matallana, J. F. Brame, and P. Mirebeau, published in S. Ouren. Jicable 2003.

Since charge density cannot be infinite, electric charge naturally spreads within the electrically insulating layer.

The lower the electric charge density, the better the dielectric behavior of the electrically insulating layer under a DC voltage.

The results are shown in detail in Table 2 below. Trapped charge density is expressed in coulombs per cubic meter ($C/m^3$).

TABLE 2

| Sample M | M-A | M-B | M-C | M-1 |
|---|---|---|---|---|
| Trapped charge density ($C/m^3$) | 250 | 120 | 180 | 100 |

It is possible to determine the efficiency with which trapped electric charge is trapped in the electrically insulating layer of the samples M-A, M-B, M-C, and M-1.

When injecting electric charge into the electrically insulating layer, a fraction of the charge disperses in the volume of said layer, while the remainder of the charge is trapped. It is this remainder that corresponds to the trapped charge density as determined above.

The efficiency is thus the quantity of trapped charge relative to the total quantity of charge injected.

Consequently, the lower the efficiency, the less charge becomes trapped, and thus the better the dielectric behavior of the electrically insulating layer under a DC voltage.

The results are shown in detail in Table 3 below. Efficiency is expressed as a percentage.

TABLE 3

| Sample M | M-A | M-B | M-C | M-1 |
|---|---|---|---|---|
| Efficiency (%) | 86 | 86 | 85 | 51 |

The results of Tables 2 and 3 show, surprisingly, that the mixture M-1 in accordance with the present invention presents better dielectric properties than do the mixtures M-A, M-B, or M-C. The mixture M-1 thus enables the quantity and the density of charge trapped in the electrically insulating layer of the cable under DC voltage to be minimized, thereby considerably reducing the risk of breakdown.

2. Resistivity as a Function of Cable Operating Temperature

The method used for determining resistivity is described in the publication "Resistivity measurements on insulating polymers: the problem of conduction currents under high voltage", by P. Mirebeau, H. Janah, J. Metallana (Nexans, France), J. C. Filippini (IRLAB, Grenoble, France), and R. Coelho in 118th Insulated Conductor Committee Meeting, Fall 2005.

The greater the variation in resistivity as a function of temperature, the more the temperature gradient that becomes established in the electrically insulating layer during operation of the cable generates space charges.

Consequently, it is important to have variation in resistivity as a function of temperature that is as small as possible.

The results are shown in detail in Table 4 below.

TABLE 4

| Sample M | M-A | M-B | M-C | M-1 |
|---|---|---|---|---|
| Ratio of the resistivity ρ (Ω · m) at a temperature of 40° C. over the resistivity ρ (Ω · m) at a temperature of 80° C. | 67 | 19 | 21 | 10 |

It can be seen that adding 7.5% styrene to sample M-1 serves to limit significantly the variation in resistivity as a function of temperature as compared with adding 15% styrene in sample M-B.

3. Depths of the Potential Wells in which Charge is Trapped

The method used for determining the depths of the potential wells is the so-called "thermo-stimulated currents" method described in detail the document "Thermal currents from corona-charged mylar" by R. A. Cresswell, M. M. Perlman, in J. Appl. Phys., Vol. 41, No. 3, pp. 2365-2375, 1970.

That method consists in putting the samples M-A, M-B, M-C, and M-1 into an electric field of 40 kilovolts per millimeter (kV/mm) at 70° C., and then in cooling them under the electric field. Thereafter, they are short-circuited through an electrometer and temperature is raised progressively from 25° C. to 130° C., rising at a rate of 2° C. per minute.

A current is observed as a function of temperature and it is possible to deduce therefrom the depth of the potential well in which the charge is trapped.

The smaller the depth of the potential well, the better the dielectric behavior of the electrically insulating layer under DC voltage.

The results are shown in detail in Table 5 below. The potential well is expressed in electron volts (eV).

TABLE 5

| Sample M | M-A | M-B | M-C | M-1 |
|---|---|---|---|---|
| Potential well (eV) | 1.18 | 1.14 | 1.18 | 1.06 |

It can be seen that adding 7.5% styrene to sample M-1 presents a potential well much smaller than in samples M-A, M-B, and M-C, and in particular M-B.

What is claimed is:

1. An electric power cable comprising:
   a central conductor element for electrically conducting direct current (DC); and
   in succession and arranged axially about said central conductor element:
   an inner semiconductive shield;
   an electrically insulating layer; and
   an outer semiconductive shield,
   wherein said electrically insulating layer is obtained from a mixture of polyethylene and a styrene copolymer,
   wherein the polyethylene is a plurimodal polyethylene wherein said styrene copolymer and said plurimodal polyethylene are combined by weight such that said electrically insulating layer exhibits uniform dielectric properties substantially throughout its thickness, and
   wherein said insulating layer does not include cross-linking by-products that lead to an increase in space charge density.

2. An electric power cable according to claim 1, wherein the content of styrene in said mixture is not greater than 10% by weight.

3. An electric power cable according to claim 2, wherein the content of styrene in said mixture is not greater than 9% by weight.

4. An electric power cable according to claim 1, wherein the polyethylene is a bimodal polyethylene.

5. An electric power cable according to claim 1, wherein the polyethylene is a medium and high density polyethylene.

6. An electric power cable according to claim 1, wherein the styrene copolymer is selected from the group consisting of copolymers of styrene and butadiene and of styrene and isoprene.

7. An electric power cable according to claim 1, wherein the styrene copolymer is a hydrogenated three-sequence copolymer.

8. An electric power cable according to claim 1, wherein the insulating layer has a thickness of at least 10 mm.

9. An electric power cable according to claim 1, wherein said insulating layer is an extruded layer.

10. An electric power cable according to claim 1, wherein said insulating layer is not cross-linked.

11. An electric power cable for electrically conducting direct current (DC) comprising:
    a central conductor element; and
    in succession and arranged axially about said central conductor element:
    an inner semiconductive shield;
    an electrically insulating layer; and
    an outer semiconductive shield,
    wherein said electrically insulating layer is obtained from a mixture of polyethylene and a styrene copolymer,
    wherein the polyethylene is a plurimodal polyethylene wherein said styrene copolymer and said plurimodal polyethylene are combined by weight such that said electrically insulating layer exhibits uniform dielectric properties substantially throughout its thickness, and
    wherein said insulating layer does not include cross-linking by-products that lead to an increase in space charge density.

* * * * *